US012602831B2

(12) United States Patent
Metzler et al.

(10) Patent No.: US 12,602,831 B2
(45) Date of Patent: Apr. 14, 2026

(54) METHOD AND SYSTEM FOR ENHANCING IMAGES USING MACHINE LEARNING

(71) Applicant: HEXAGON TECHNOLOGY CENTER GMBH, Heerbrugg (CH)

(72) Inventors: Bernhard Metzler, Dornbirn (AT); Harald Vennegeerts, Berlin (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 502 days.

(21) Appl. No.: 17/379,654

(22) Filed: Jul. 19, 2021

(65) Prior Publication Data

US 2022/0020178 A1     Jan. 20, 2022

(30) Foreign Application Priority Data

Jul. 20, 2020     (EP) ..................................... 20186777

(51) Int. Cl.
*G06T 7/90* (2017.01)
*G06N 3/08* (2023.01)
(Continued)

(52) U.S. Cl.
CPC ................. *G06T 7/90* (2017.01); *G06N 3/08* (2013.01); *G06T 7/73* (2017.01); *G06T 7/97* (2017.01);
(Continued)

(58) Field of Classification Search
CPC .... G06T 7/90; G06T 7/73; G06T 7/97; G06T 2207/20081; G06T 2207/20084; G06T 2207/10024; G06T 5/50; G06N 3/08
See application file for complete search history.

(56) References Cited

U.S. PATENT DOCUMENTS 10,515,435 B2 * 12/2019 Navarrete Michelini ...................
G06T 3/4046
11,688,100 B1 * 6/2023 Sun ......................... H04N 23/62
382/156
(Continued)

FOREIGN PATENT DOCUMENTS

CN       110363820 A     10/2019
CN       111709902 A  *  9/2020  ............. G06K 9/629
(Continued)

OTHER PUBLICATIONS

C.-H. Chen, S.-J. Chen and P.-Y. Hsiao, "Edge Detection on the Bayer Pattern," APCCAS 2006—2006 IEEE Asia Pacific Conference on Circuits and Systems, Singapore, 2006, pp. 1132-1135, doi: 10.1109/APCCAS.2006.342321 (Year: 2006).*
(Continued)

*Primary Examiner* — Matthew C Bella
*Assistant Examiner* — Janice E. Vaz
(74) *Attorney, Agent, or Firm* — Maschoff Brennan

(57) ABSTRACT
A method for enhancing images for metrological applications. A first set of first images is provided, wherein the first set comprises at least one first image, the first set representing a scene of interest, and a second set of second images is provided, wherein the second set comprises at least one second image, the second set representing at least a part of the scene of interest. The method comprises the following steps: 1) jointly processing the first set and the second set by a neural network, and 2) outputting a third set of images by the neural network, the third set comprising at least one processed image, from which is determinable the position and/or orientation of the at least one object with a processed precision, wherein the processed precision is equal to or higher than the initial precision.

18 Claims, 4 Drawing Sheets

(51) Int. Cl.
G06T 7/00 (2017.01)
G06T 7/73 (2017.01)

(52) U.S. Cl.
CPC .............. *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 12,027,006 | B1 * | 7/2024 | Parsadayan | .......... G05B 19/042 |
| 12,100,194 | B1 * | 9/2024 | Gowda | .................. G06V 10/60 |
| 2018/0188733 | A1 * | 7/2018 | Iandola | .................. G06F 30/15 |
| 2019/0371053 | A1 * | 12/2019 | Engholm | ................ G06T 17/10 |
| 2020/0089998 | A1 | 3/2020 | Zagaynov et al. | |
| 2020/0234414 | A1 * | 7/2020 | Zamir | ...................... G06T 5/007 |
| 2021/0334944 | A1 * | 10/2021 | Spickermann | ......... G06V 20/58 |
| 2021/0406560 | A1 * | 12/2021 | Park | ...................... G01S 13/867 |

FOREIGN PATENT DOCUMENTS

| | | |
|---|---|---|
| EP | 15176238 A | 1/2017 |
| WO | 2020/069049 A1 | 4/2020 |

OTHER PUBLICATIONS

S. Li, "Monitoring Around a Vehicle by a Spherical Image Sensor," in IEEE Transactions on Intelligent Transportation Systems, vol. 7, No. 4, pp. 541-550, Dec. 2006, doi: 10.1109/TITS.2006.883116., (Year: 2006).*

T. Lin, B.-H. Liao, S.-L. Hsu and J. Wang, "Experimental investigation of HSL color model in error diffusion," 2015 8th International Conference on Ubi-Media Computing (UMEDIA), Colombo, Sri Lanka, 2015, pp. 268-272, doi: 10.1109/UMEDIA.2015.7297467 (Year: 2015).*

Chen, C., Chen, Q., Xu, J., & Koltun, V. (2018). Learning to see in the dark. In Proceedings of the IEEE conference on Computer Vision and Pattern Recognition (pp. 3291-3300) (Year: 2018).*

P. Vechersky, M. Cox, P. Borges and T. Lowe, "Colourising Point Clouds Using Independent Cameras," in IEEE Robotics and Automation Letters, vol. 3, No. 4, pp. 3575-3582, Oct. 2018, doi: 10.1109/LRA.2018.2854290 (Year: 2018).*

T. C. Bybee and S. E. Budge, "Method for 3-D Scene Reconstruction Using Fused LiDAR and Imagery From a Texel Camera," in IEEE Transactions on Geoscience and Remote Sensing, vol. 57, No. 11, pp. 8879-8889, Nov. 2019, doi: 10.1109/TGRS.2019.2923551 (Year: 2019).*

T. Mikami, D. Sugimura and T. Hamamoto, "Capturing color and near-infrared images with different exposure times for image enhancement under extremely low-light scene," 2014 IEEE International Conference on Image Processing (ICIP), Paris, France, 2014, pp. 669-673, doi: 10.1109/ICIP.2014.7025134. (Year: 2014).*

Extended European Search Report dated Jan. 19, 2021 as received in Application No. 20186777.7.

Chen et al. (Chen, C., Chen, Q., Xu, J., & Koltun, V. (2018). Learning to see in the dark. In Proceedings of the IEEE Conference on Computer Vision and Pattern Recognition (pp. 3291-3300).

Chen, C., Chen, Q., Do, M. N., & Koltun, V. (2019). Seeing motion in the dark. In Proceedings of the IEEE International Conference on Computer Vision (pp. 3185-3194)).

CN Office Action dated Mar. 22, 2024 as received in Application No. 202110812434.1.

\* cited by examiner

14a

14b

15

1

16

METHOD AND SYSTEM FOR ENHANCING IMAGES USING MACHINE LEARNING

BACKGROUND

The present invention relates to a method, computer program product and system according to the preambles of the independent claims.

Images acquired in the real world are often deficient in some sense. In dim or in quickly changing environments, for example, it is often the case that images acquired under such conditions are perceived to be dark by the human eye, wherein quick changes might arise from fast camera movement. In the case of fast camera movement, short exposure times of the camera taking an image might be necessary to avoid blurry images; the short exposure time, however, leads to images perceived to be dark by a human observer. Such dark images may additionally comprise a significant amount of noise. It may therefore be beneficial to improve the dark image prior to further processing, e.g. to enable a human observer to identify objects in the image and to infer metrological information from the identified objects. For a low signal-to-noise ratio (SNR) of the image, algorithms used for enhancing the image are preferentially non-linear, as the non-linearity may help to separate signal from noise and selectively amplify only the signal.

Images are typically presented to a human observer and/or to a machine. A human observer and/or a machine extracts information from the images. EP15176238 provides an example of image-based metrology. The extracted information is often spatial in nature and pertains e.g. to distance information or relative locations of two objects to one another.

For the triangulation of an object, for example, two images of said object may be used to infer the spatial position of the object. Knowing the base distance between the camera(s) providing the two images, corresponding features in the two images, a feature being for example a corner of the object, may be detected and used for determining the 3D position of the part of the object corresponding to the detected corresponding features. Triangulation using corresponding features requires a precise determination of features in the two images. If the detected features were for example shifted away from their true position in the two images, the object would not be triangulated correctly.

Feature detection accuracy is typically dependent on the SNR of the analyzed image. Images acquired in dim or in quickly changing environments are often characterized by a low SNR. For such images, feature detection would produce many mistakes, and subsequent triangulation using partly faulty features would provide wrong 3D positions of triangulated objects. Images with a low SNR may therefore need to be enhanced prior to further processing.

Mapping urban environments as an example of a metrological application can be done using a mobile mapping platform, for example a car-based mapping platform. The aim of mapping urban environments is to obtain a dense 3D reconstruction of houses, trees and other at least temporally stationary objects in cities. A car used for mapping an urban environment may be equipped with a Lidar imaging system and cameras, for example. The pixels of an image sensor of the camera typically correspond to square areas having side lengths in the sub-centimeter range in the object space. Structures in an urban environment in the sub-centimeter range are therefore typically mapped onto one pixel. The car may drive through narrow streets lined by tall buildings blocking direct sunlight, leading to a dim environment particularly before or after peak daylight conditions. Car-based mapping systems are typically moving with speeds between 10 to 30 meters per second. The combination of dim urban environments and required short exposure times—to avoid blurry images due to the movement of the car—leads to low SNR images, the low SNR images being dark. Similar considerations about dim environments often apply to indoor environments, too.

In terrestrial laser scanning applications or mobile mapping applications, for example, point cloud data acquired by a laser scanner may be colored using color images provided by a color resolving camera. If the color images are acquired in dim or in quickly changing environments, the resulting color images are often characterized by a low SNR. As measurements in the colored point cloud typically depend on the colors of the colored point cloud, it may be necessary to enhance the color images prior to coloring the point cloud to improve subsequent measurement in the colored point cloud. A user may also select individual points or regions in the colored point cloud depending on the color information, for example for further inspection. It may also be necessary to improve a color fidelity (corresponding to white balancing) and/or to make colors more vivid prior to coloring the point cloud, for example.

In case an image is dark, it may be enhanced in brightness by methods as described in two publications by Chen et al. (Chen, C., Chen, Q., Xu, J., & Koltun, V. (2018). Learning to see in the dark. In Proceedings of the IEEE Conference on Computer Vision and Pattern Recognition (pp. 3291-3300) and Chen, C., Chen, Q., Do, M. N., & Koltun, V. (2019). Seeing motion in the dark. In Proceedings of the IEEE International Conference on Computer Vision (pp. 3185-3194)). The first of the two papers proposes a technique for enhancing single images, while the second of the two papers provides a technique for enhancing videos. Both papers utilize deep learning methods, i.e. input/output training data comprising dark images and corresponding bright ground truth images are used for learning a mapping from a dark image to an enhanced bright image. Due to the nonlinearity and the use of prior knowledge encoded in the learned convolutional neural network, the SNR of an enhanced bright image is typically improved compared to the dark images provided to the convolutional neural network for enhancement. The techniques studied in the two papers by Chen et al. do not take metrological properties of the images into account, i.e. the algorithm is explicitly designed to only enhance an input image without any relation to or consideration of metrology.

Different image sensors may capture different information about a scene of interest. Cameras, for example, may capture light of different spectral ranges. The information comprised by images captured by different image sensors may provide at least partly independent information relating to a metrological application. Combining such information optimally, however, is in general a difficult problem.

SUMMARY

It is therefore an objective of the present invention to provide a method for enhancing images while improving metrological properties.

A further objective of the present invention is to provide a method for enhancing images obtained by mobile or static mapping platforms while improving metrological properties.

A further objective of the present invention is to provide a method for enhancing images obtained by mobile or static mapping platforms mapping urban environments while improving metrological properties.

These objectives are achieved by realizing the characterizing features of the independent claims. Features which further develop the invention in an alternative or advantageous manner are described in the dependent patent claims.

The invention relates to a method for enhancing images for metrological applications. A first set, the first set in particular being a first sequence, of first images is provided, wherein the first images are sensor images, wherein the first set comprises at least one first image, the first set representing a scene of interest, and a second set, the second set in particular being a second sequence, of second images is provided, wherein the second images are sensor images, wherein the second set comprises at least one second image, the second set representing at least a part of the scene of interest. The at least one first image and the at least one second image differ geometrically. A position and/or an orientation of at least one object within the scene of interest is determinable from the first set and/or from the second set with an initial precision. The method comprises the following steps: 1) jointly processing the first set and the second set by a neural network, and 2) outputting a third set, the third set in particular being a third sequence, of images by the neural network, the third set comprising at least one processed image, from which is determinable the position and/or orientation of the at least one object with a processed precision, wherein the processed precision is equal to or higher than the initial precision.

The scene of interest may be in an urban environment which is often characterized by narrow streets lined by tall buildings on either side blocking direct sunlight. Such urban environments are often dim, particularly before or after peak daylight conditions. The scene of interest may be a street in a city, for example, wherein the street is to be mapped. Views of a scene of interest in an urban environment may also be blocked from above, for example due to crowns of trees or due to protruding parts of buildings. The first set of first images and the second set of second images in the present invention preferentially capture (image) a scene of interest—in case the scene of interest lies in an urban environment—from a viewing position which is substantially of the same height as typical structures in the scene, for example buildings or trees. Since the first and second images—especially in urban environments—capture the scene of interest from a viewing position which is close to the scene of interest, structures in the urban environment in the sub-centimeter range are therefore typically mapped onto one pixel of the first images or the second images.

The term "representing" refers to relevant information captured by the first set and the second set about the scene of interest, irrespective of how that relevant information was generated, for example by capturing with a physical sensor or by simulation.

A scene of interest, for example a street in an urban environment, may be mapped using a mobile mapping platform, for example a car-based mapping platform equipped with imaging devices configured to capture the scene of interest. Since the car-based mapping system is typically moving with speeds between 10 to 30 meters per second, images provided by the imaging devices comprised by the car-based mapping system may need to be captured with short exposure time to avoid a blurry image due to the movement of the car. Coupled with the dim environment often encountered in urban environments, an image provided by e.g. a typical RGB camera may be dark, wherein dark here refers to a qualitative statement made by a typical human observer of the sensor image. An image provided by e.g. a typical RGB camera may be perceived to be dark by a human observer. Such 'dark' images typically have a low SNR as well, for noise sources affecting image quality, e.g. thermal noise in an image sensor, are more pronounced in low-light imaging conditions as compared to imaging in broad daylight, for example.

Besides capturing images with short exposure time to avoid blurry images, a longer exposure time may be used as well. This way, color information is better preserved in the images at the cost of increased blurriness, increasing the SNR. The neural network may learn to compensate the blurriness.

An image provided by e.g. a typical RGB camera comprised by the car-based mapping system may therefore typically have a low image contrast. Image contrast measures the difference between the highest and lowest intensity values of an image. A low image contrast therefore implies that few easily discernible structures are visible in the corresponding image. For an RGB image, for example, image contrast may be computed using the luminance computed from each pixel of the RGB image, for example.

The first set of first images provided to the neural network may comprise at least one dark image. The first set shows the scene of interest. An image sensor providing the first set and a different image sensor providing the second set can at least partly be characterized by a mathematical camera model, e.g. a pinhole camera model, or an orthographic projection, or a scaled orthographic projection, or a paraperspective projection, or a perspective projection. Images acquired by the image sensor or the different image sensor are typically distorted, wherein distortion relates to a changed dimensioning as compared to the scene of interest. The image distortion is influenced by at least a combination of image sensor position and orientation, the spatial arrangement of the imaged scene of interest and the mathematical camera model describing the image sensor. A distortion of each first image of the first set may be summarized in a first projected distortion set and a distortion of each second image of the second set may be summarized in a second projected distortion set.

The at least one first image and the at least one second image differ geometrically and/or radiometrically from one another. Geometric difference may arise in a number of different ways, wherein combinations of the following are feasible as well: 1) a type of the image sensor acquiring the first set and a type of the image sensor acquiring the second set may be different 2) the image sensor acquiring the first set and the image sensor acquiring the second set may be positioned at different locations and/or with different orientations with respect to a global coordinate system. Radiometric differences may be the result of different wavelength acquisition ranges of the image sensor acquiring the first set and the image sensor acquiring the second set, for example.

The first set and the second set capture therefore partly redundant and partly non-redundant information, or independent information, about the scene of interest. Due to the presence of non-redundant information in the second set compared to the first set, or in the first set compared to the second set, the non-redundant information, or independent information, may be transferred from one set to the other. As the amount of information present depends on a task for which it is to be used, the non-redundant information may need to be suitably extracted from either the first set or the second set or from both, in case both sets possess independent information. Information for a task may be considered to be independent, for example, if in a suitable space, potentially after a transformation of the first set and/or the second set, the information in the suitable space coming from the first set is orthogonal to the information coming from the second set. As long as non-redundant information for a task is present in either of the two sets as compared to the other, processing of the first set and the second set may allow the task to be solved in an improved way.

In case the first set comprises a plurality of first images, the first images may show the scene of interest from different positions and orientations. In case the second set comprises a plurality of second images, the second images may at least partly show the scene of interest from different positions and orientations.

Using at least the first set, metrological information such as the position of a house or car in an urban environment may be determined, for example. Since at least one image from the first set may be 'dark', prior to further metrological processing it is beneficial to enhance the first set using a second set of second images. The second set may be provided by a different image sensor than the image sensor providing the first set. The second set shows at least a part of the scene of interest shown by the first set. The second set may be provided by an image sensor embodied e.g. as a monochrome camera or as a Lidar imaging system. The second set therefore typically provides information relating to the metrological application which is at least partly independent of the information provided by the first set. Independence is to be understood with respect to the extent to which information may be used to improve results of the metrological application. If the second set provides information which may be used in combination with the information provided by the first set to improve the metrological application, then the second set provides some information which is independent of the information provided by the first set. As long as independent information exists in the second set, the second set may also be 'dark', for example.

The first set and the second set are provided to a neural network for image enhancement. The neural network may comprise a substructure which is similar to a neural network architecture as described by Chen et al. cited above. It may additionally comprise at least one layer dedicated to fuse the first set and the second set. The neural network provides at least one processed image as output, the at least one processed image forming the third set. The metrological application may use the third set. Which information provided by the first set and by the second set is usable for the purposes of the metrological application typically depends on the neural network. Ideally, the neural network is trained in such a way as to maximize the amount of extracted usable information from the first set and the second set.

Machine learning techniques such as neural networks comprise knowledge about a task to be solved—obtained via a training process using input/output pairs of images, for example. The image enhancement provided by the neural network according to the invention is such that the metrological application provides improved results if executed on processed images provided by the neural network as compared to the case that the metrological application is carried out on the first set and/or the second set. In case the metrological application comprises determining a position and/or an orientation of an object in the scene of interest, the position and/or the orientation of said object may be determined with an initial precision using the first set and/or the second set. The same method for determining the position and/or the orientation of the object in the scene of interest may determine the position and/or the orientation with a processed precision using the third set. Both initial precision and processed precision may be measured with respect to a ground truth position of the object in the scene of interest. Using the image enhancement method according to the invention, the processed precision is equal to or higher than the initial precision.

The at least one processed image received from the neural network may be used for metrological applications, for example for triangulation purposes or for colorization of point clouds.

To illustrate the invention, a number of embodiments are discussed next.

The first set may for example comprise color images having low brightness, and therefore also low contrast and low SNR. The second set may comprise monochrome images having good brightness and contrast. The neural network may provide as output color images having good brightness.

As another example, the first set may comprise color images having low resolution. The second set may comprise monochrome images having high resolution. As a numerical example, a first camera providing the first set may have a focal length that leads to a lateral resolution on the object of 2 mm/pixel in a distance of 10 meters. A second camera providing the second set, the second camera having the same focal length as the first camera and twice the resolution, would then have a lateral resolution on the object of 1 mm/pixel. An edge detection algorithm measuring the position of an edge with a precision of $\frac{1}{10}$ pixels would then lead to 0.2 mm in the images of the first set and to 0.1 mm in images of the second set. The neural network may output a color image with high resolution.

As another example, the first set may comprise color images having high distortions, e.g. from a fish-eye lens. The second set may comprise monochrome images having low distortions. The second set may also be provided by a Lidar imaging system whose distortions are small, i.e. the imaging process leading to images in the second set may be described by a pinhole camera model. The second set may also be acquired by a camera having better optics than the camera acquiring the first set. The neural network may provide as output a color image having low distortions. Cameras used for measurements these days are typically factory calibrated with respect to lens distortions; in case the lens/image sensor setup changes in the field, e.g. temperature changes, shock, etc. the calibration parameters are not valid anymore; the camera providing the second set may be mechanically more stable than the camera providing the first set. A Lidar imaging system may be mechanically more stable than a conventional camera, for example.

As another example, the first set may comprise color images having motion blur. The second set may comprise monochrome images which are sharp. The neural network may provide as output color images which are sharp. In sharp images, relevant measurement features may be better defined than in blurred images. This may be beneficial for manual measurement, e.g. the user clicks onto a pixel defining the feature, and for measurement algorithms based on digital image processing techniques, e.g. edge detection.

As another example, the first set may comprise color images having different colors in different regions of the images of the first set. Such color difference may be the result of camera orientation and position with respect to an imaged object and of properties of the imaged object. The second set may comprise monochrome images having correct intensity. The neural network may provide as output images having the same intensity, i.e. correct radiometry, in all parts of the provided images. The intensity of a pixel is typically defined by the position of the light source (e.g. the sun), the orientation and "roughness" of the object's surface, and the position of the camera. When images of the same objects are taken from different positions the color (mainly the intensity) might be different due to the reflectance on the object resulting from the aspects mentioned before. Combining the first set with a second set provided e.g. by a Lidar imaging system, the second set e.g. based on the Lidar intensity values, may lead to radiometric improvement. As the Lidar functions as the light source, a second set acquired by the Lidar is radiometrically more correct as it is influenced to a lesser extent by "external" light sources such as the sun. On diffuse surfaces in particular, this approach can improve the color consistency significantly.

Radiometric correctness is for example important for metrological applications in the field of forensics. If a blood stain is for example to be identified in an image, it is vital that the image is radiometrically correct. Such a blood stain identification may then be used for determining the 3D position of the identified blood stain in the imaged scene.

The first set or the second set may also be provided by an infrared camera, in particular by a thermographic camera. Images provided by the infrared camera may provide higher geometric correctness in dark environments, for example, than images provided by an RGB camera or a monochrome camera. Alternatively, in case the infrared camera provides images with lower geometric correctness than an RGB camera or monochrome camera, for example, the infrared image may be upscaled based on an RGB image or monochrome image of higher resolution using the method according to the invention.

In an embodiment of the method, the at least one first set image of the first set is color-resolved, in particular obtained by a color-resolving camera with a Bayer pattern.

The first set may therefore comprise at least one RGB image provided by an RGB camera. In case the camera uses a Bayer pattern, the data provided by the camera may need to be pre-processed before feeding them to the neural network. The pre-processing may provide three separate RGB images of lower resolution than the originally captured Bayer image. Alternatively, the raw Bayer pattern images may be directly provided to the neural network.

In another embodiment of the method, the at least one second image of the second set is provided by a monochrome camera.

As a monochrome camera may possess a higher sensitivity than a color resolving camera, the images acquired by a monochrome camera may have a higher SNR compared to e.g. RGB images. A second set acquired by the monochrome camera may therefore have a higher contrast and more geometric information about the captured at least part of the scene of interest than a sensor image acquired by an RGB camera.

In another embodiment of the method, the at least one second image of the second set is provided using a Lidar imaging system, wherein intensity of received electromagnetic pulses, in particular in combination with distances obtained from the received electromagnetic pulses, is used for deriving the at least one second image.

The Lidar imaging system may be mounted on a car-based mapping platform, for example, to densely or sparsely map an urban environment. A Lidar imaging system emits measurement pulses, in particular electromagnetic measurement pulses, wherein the emitted measurement pulses are reflected from objects in the scene of interest. Reflected measurement pulses are subsequently received by the Lidar imaging system. The intensity of the received measurement pulses may then be determined. Based on such intensity information, the at least one second image may be constructed by scanning the scene of interest with the Lidar imaging system. Alternatively, both intensity and distance may be used for constructing the at least one second image. The use of distance information may mitigate the impact of errors in the at least one second image arising from uncertain and potentially wrong intensity values due to the angle of incidence of a laser beam of the Lidar. Depending on the scanning procedure carried out by the Lidar imaging system, the obtained raw intensity image may need to be re-gridded, potentially requiring interpolation, to obtain the at least one second image. Alternatively, using the time of arrival of received measurement pulses, 3D information about the scanned scene of interest may be derived. The 3D point cloud obtained in such a way may be centrally projected onto a sequence of Lidar image planes, each Lidar image plane from the sequence of Lidar image planes in particular corresponding to a set element of the set of image planes of the image sensor acquiring the first set. After central projection onto a Lidar image plane, the projected 3D point cloud data may be re-gridded so as to conform to the pixel grid of the image sensor acquiring the first set.

Since a Lidar imaging system is an active imaging system, a high-contrast and radiometrically correct second set may be obtained in dim environments as well.

In another embodiment of the method, the at least one first image is upsampled by the neural network, wherein a resolution of the upsampled at least one first image is higher than a resolution of the at least one first image.

Higher resolution may pertain to the ratio between the size of the field of view which may be captured by the image sensor providing the first set to the number of pixels used in the representation of the at least one first image which may be provided by the image sensor.

In another embodiment of the method, the first set comprises dark first images, dark referring to a perception quality by a human observer.

In another embodiment of the method, a fourth set of fourth images, the fourth set in particular being a fourth sequence, wherein the fourth set comprises at least one fourth image, wherein the at least one fourth image is a sensor image, is additionally provided to the neural network as input, wherein the first set is provided by a color-resolving camera, the second set is provided by a monochrome camera, and the fourth set is provided using the Lidar imaging system.

In another embodiment of the method, the neural network comprises at least one convolutional layer.

In another embodiment of the method, the first set and the second set provided to the neural network comprise only one first image and only one sensor image respectively, and the third set received from the neural network comprises only one image, and weights of the neural network are obtained by training the neural network on training data, wherein the training data comprise as 1) training data input at least one first training image which is statistically similar to the first image and at least one second training image which is statistically similar to the second image, and as 2) training data output at least one third training image from which is determinable with high precision a training position and/or training orientation of at least one training object shown in the at least one first training image and the at least one second training image. The neural network jointly maps the training data input onto the training data output, wherein the loss function used for training the neural network is embodied as a mean squared error loss function.

Other loss functions may be used as well such as the mean absolute error (L1 loss) loss function, or the Huber loss, or the cosine distance loss, or the Hinge loss, or the Kullback-Leibler divergence, or cross entropy (including binary cross entropy), or the soft margin loss, or triplet losses such as the triplet margin loss or the triplet ratio loss. The loss function may also be configured in such a way as to place particular importance on preserving edge information from the second set, for example.

In case the first set, the second set and the third set each comprise only one set element, weights (parameters) of the neural network may be trained using a training data set constructed in the following way: the training data set comprises as input a nonempty set of first training images, a nonempty set of second training images and a nonempty set of third training images. The set of first training images and the set of second training images may comprise images which are statistically similar to the first image and the second image. The set of third training images comprises desired images for which it is known that a metrological application can be carried out with a high precision using the third training images. By training the neural network, for example by using stochastic gradient descent, the neural network learns (an approximation to) the mapping between corresponding first training images and second training images onto third training images.

The at least one training object may differ from objects imaged during the inference phase, i.e. from objects imaged after the training process is complete and the method according to the invention is used in production.

In another embodiment of the method, the at least one third training image is brighter than the at least one first training image.

The at least one third training image may be brighter than the at least one first training image. Besides being brighter, the at least one third training image may also comprise better geometric information than the at least one first training image, geometric information e.g. relating to the sharpness of object contours of objects shown in the at least one third training image as compared to in the at least one first training image. To enforce the increase of sharpness of object contours by the neural network, the error metric used for training the neural network may be adapted, for example by adding an additional cost term measuring the sharpness of object contours. The at least one third training image may also have a higher SNR than the at least one first training image and/or it may have more vivid colors and/or it may have a higher resolution and/or it may have higher color fidelity.

Vividness of a color may be defined in a hue-saturation-lightness (HSL) color space, for example. The vividness may be measured using the saturation component. A color becomes more vivid if moving out from the center of a HSL cylinder to the edge of the HSL cylinder, for example.

In another embodiment of the method, the first set and the second set provided to the neural network comprise at least two first images and at least two second images respectively, and the third set received from the neural network comprises at least two processed images, and weights of the neural network are obtained by training the neural network on training data, wherein the training data comprise as 1) training data input a first training sequence of at least two images which are statistically similar to the at least two first images and a second training sequence of at least two images which are statistically similar to the at least two second images, and as 2) training data output a training position and/or a training orientation of at least one training object shown in the first training sequence and the second training sequence. The neural network jointly maps the training data input onto a training output sequence of images which are then mapped by at least one differentiable and fixed equation, the at least one fixed equation representing the metrological application, in particular triangulation, onto a candidate training position and/or a candidate training orientation of the at least one training object, wherein the loss function used for training the neural network is embodied as a mean squared error loss function, wherein the training is designed to minimize the loss between the training position and the candidate training position and/or the training orientation and the candidate training orientation.

The neural network may jointly map at least two first images and at least two second images onto at least two processed output images. The neural network may be trained to provide processed output images on which a metrological application can be carried out with a high processed precision. The term fixed equation is here understood to refer to an equation for which no parameters (weights) are to be learned during the training process; instead, the equation is fully specified before training and remains fixed during and after training. The training is done in the following way: given a metrological application represented by at least one fixed and differentiable equation, wherein the at least one fixed and differentiable equation comprises the at least two processed output images as input, the neural network may be trained to generate the at least two processed output images in such a way that—upon application of the at least one fixed and differentiable equation, e.g. representing triangulation—a candidate position and/or a candidate orientation is determined which can be compared to a training position and a training orientation respectively. Training the neural network proceeds then by minimizing an error metric comprising the generated candidate position and/or the generated candidate orientation and the training position and/or the training orientation as input, wherein the error metric may be minimized on the entire training data set.

The invention also relates to a computer program product with program code being stored on a machine readable medium or embodied as an electromagnetic wave, the program code being configured to provide a trained neural network as in the method according to the invention.

The computer program product therefore provides the training procedure which may be required to obtain a neural network which may be used on previously unseen input.

The invention also relates to a computer program product with program code being stored on a machine readable medium or embodied as an electromagnetic wave, the program code being configured to provide image enhancement as in the method according to the invention.

The computer program product may therefore carry out the processing of the first set and the second set by the neural network.

The invention also relates to an image processing system comprising a computing unit, a computer program product with program code according to the invention being stored on the computing unit, and at least two image sensors, a first of the at least two image sensors in particular comprising a fisheye lens, each providing at least one image to the computing unit, wherein the image processing system is configured to carry out the image enhancement method.

In case a fisheye lens is present, a neural network used for image enhancement for metrological applications may possibly learn to correct geometric distortions introduced by the fisheye lens. The neural network may learn to correct such geometric distortions if it is explicitly instructed to do so, for example through a suitable construction of a training data set used for training the neural network, or it may learn to correct such geometric distortions implicitly, for example in case it is required to learn a mapping allowing for a subsequent high precision metrological application and a higher precision is reachable by correcting the geometric distortion.

The invention also relates to an image processing system, wherein the image processing system is specifically configured for being part of a car-based mapping platform or of a rail-based mapping platform or of a mapping platform carried by a user or of a static mapping platform.

A mobile mapping platform may map a scene of interest, for example a street in an urban environment. The mobile mapping platform may be equipped with a RGB camera acquiring the first set and a monochrome camera acquiring the second set, for example.

Image sensors providing the first set and the second set may be mounted on the mobile mapping platform in such a way that the relative geometric arrangement between the mounted image sensors is known. The mounted image sensors may be calibrated as well.

A static mapping platform may for example be embodied by a terrestrial laser scanning system comprising a RGB camera and a laser scanner. The RGB camera may provide the first set, and the laser scanner may provide the second set.

Using the method according to the invention, metrological applications may be carried out using images provided by cheaper image sensors than typically used, for 'dark' and low SNR images, for example, may be at least partly 'corrected' through the image enhancement provided by a neural network.

BRIEF DESCRIPTION OF THE DRAWINGS

The inventive system is described below in more detail purely by way of example with the aid of concrete exemplary embodiments illustrated schematically in the drawings, further advantages of the invention also being examined Identical elements are labelled with the same reference numerals in the figures. In detail.

DETAILED DESCRIPTION

Figure 1:
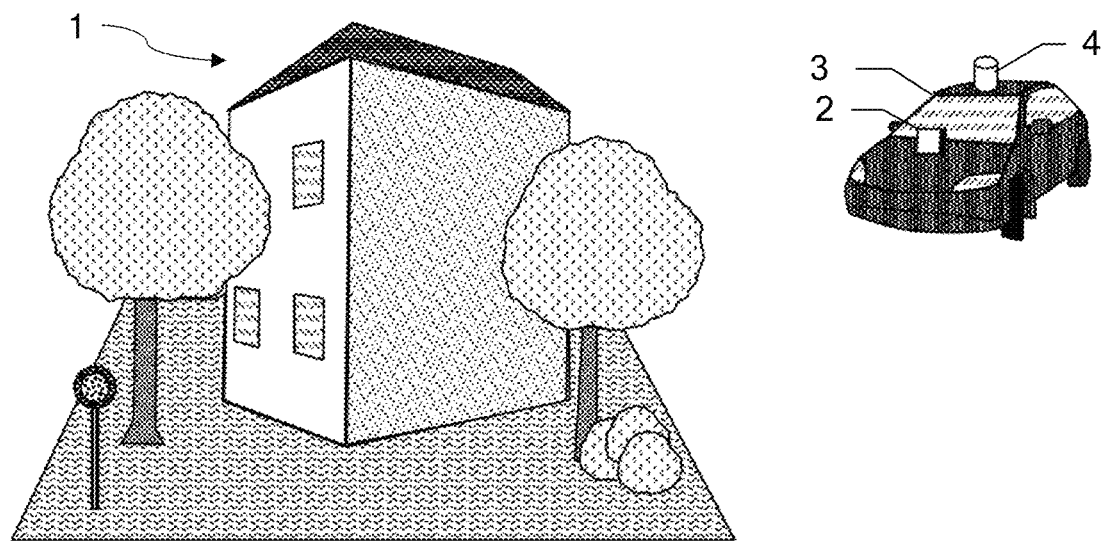
FIG. 1 shows an embodiment of the invention used for mapping a scene of interest with a car-based mobile mapping platform.

FIG. 1 shows an embodiment of the invention used for mapping a scene of interest 1 with a car-based mobile mapping platform 3. An RGB camera 2 and a Lidar imaging system 4 are mounted onto a car. The car may be continuously moving while acquiring the environment. A car-based mobile mapping platform 3, for example, may typically be moving with velocities between 10-30 meters per second. Rail-based systems may be used for mapping as well. A mobile mapping system may also be carried by a human. Such hand-held mobile mapping systems may have lower speeds of locomotion and greater dynamics such as rotational speeds than car- or rail-based systems. The Lidar imaging system 4 and the RGB camera 2 may have a known position and orientation to one another. The car-based mobile mapping platform 3 may drive through narrow streets in urban environments, mapping the environment it drives through. One metrological application might be to obtain to obtain a dense 3D reconstruction of an urban scene of interest 1. The dense 3D reconstruction should comprise both an actual 3D reconstruction, i.e. location information of imaged surfaces in a 3D coordinate system, but also color information associated to said images surfaces. Using the method according to the present invention, dark and low SNR color images, also termed first images, provided by the RGB camera 2 may be enhanced using the second images provided by the Lidar imaging system 4, for example.

Figure 2:
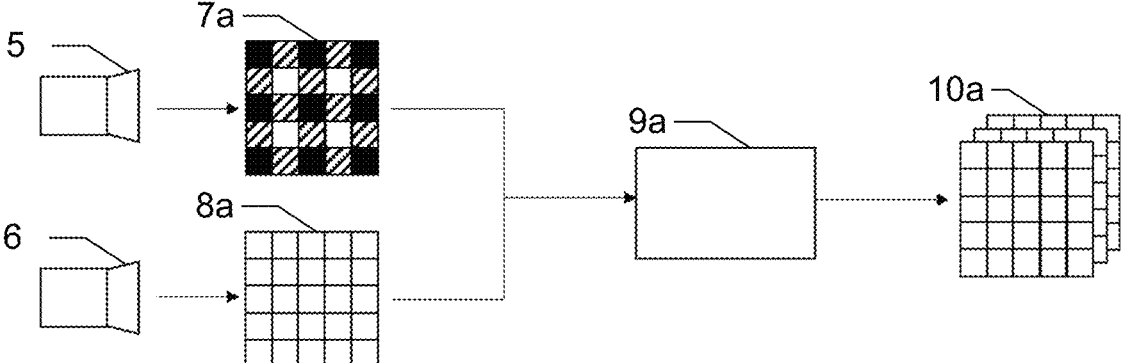
FIG. 2 shows an embodiment of the method according to the invention.

FIG. 2 shows an embodiment of the method according to the invention. An RGB camera 5 and a monochrome camera 6 provide images. The RGB camera 5 provides a first set 7a, wherein the first set 7a in FIG. 2 comprises only one first image, namely a noisy Bayer image, wherein the noisy Bayer image may be taken with a short exposure time in order to avoid motion blur or the noisy Bayer image may be taken in a dim environment. The monochrome camera provides a second set 8b, wherein the second set 8a in FIG. 2 comprises only one second image, namely a monochrome image. Due to a higher sensitivity of the monochrome camera 6, the monochrome image provided by the monochrome camera 6 comprises better geometric information than the noisy Bayer image.

The noisy Bayer image and the monochrome image are provided as input to a neural network 9a for image enhancement. The neural network 9a may comprise a convolutional layer. A metrological application, for example triangulation, may use the noisy Bayer image and/or the monochrome image, wherein an object which is visible in the noisy Bayer image and/or the monochrome image may be triangulated with an initial precision using the noisy Bayer image and/or the monochrome image. The color information for coloring the triangulated object is in this example provided by the noisy Bayer image. The neural network 9a enhances the noisy Bayer image and the monochrome image in such a way that the image provided by the neural network 9a, also termed third set 10a, the third set 10a comprising only one image in FIG. 2, allows for carrying out the metrological application, for example triangulation, with a processed precision. The processed precision is larger than the initial precision. The neural network 9a therefore jointly enhances the noisy Bayer image 7a and the monochrome image 8a and provides an output image on which the metrological application can be carried out with greater quality.

The neural network 9a is trained in such a way according to the invention as to provide an output image targeted to a metrological application carried out on the output image. This may be achieved by using the following type of training data for the scenario in FIG. 2: a training data input comprising a plurality of training pairs, each training pair comprising a noisy training Bayer image and a monochrome training image, and a training data output comprising training output images. The neural network is trained to learn a mapping from a training pair to a training output image. At least one training pair should be statistically similar to the noisy Bayer image and the monochrome image. The training output images provided allow for a high quality metrological application. If the training output images are for example brighter than the noisy training Bayer images, the neural network $9a$ may learn to brightness-enhance input images.

Figure 3:
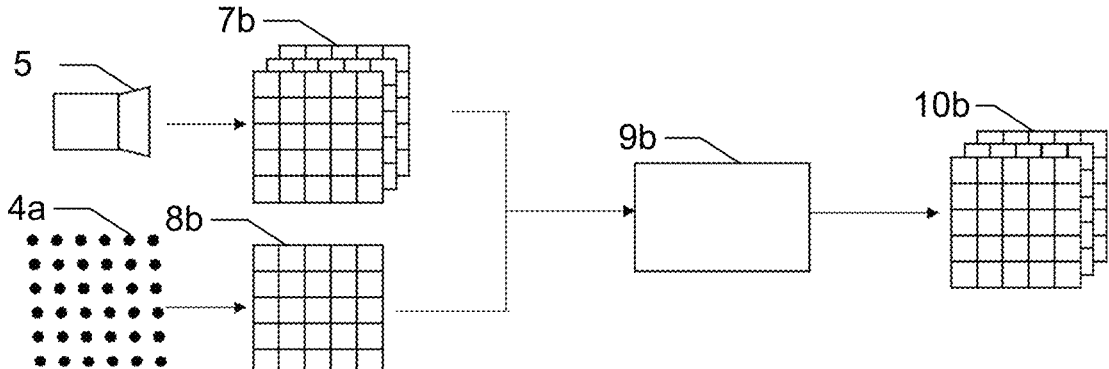
FIG. 3 shows an embodiment of the method according to the invention.

FIG. 3 shows an embodiment of the method according to the invention. An RGB camera 5 and a Lidar imaging system provide images. The RGB camera 5 provides a first set $7b$, wherein the first set $7b$ in FIG. 3 comprises only one first image, namely a three-channel RGB image, wherein the three-channel RGB image may be taken with a short exposure time in order to avoid motion blur or the three-channel RGB image may be taken in a dim environment.

The Lidar imaging system emits measurement pulses, in particular electromagnetic measurement pulses, wherein the emitted measurement pulses are reflected from objects in the scene of interest. Reflected measurement pulses are subsequently received by the Lidar imaging system. The intensity $(4a)$ of the received measurement pulses may then be determined. Based on such intensity information, the second set $8b$ may be constructed by scanning the scene of interest with the Lidar imaging system, wherein in FIG. 3 the second set $8b$ comprises only one second image. Depending on the scanning procedure carried out by the Lidar imaging system, the obtained raw intensity image may need to be re-gridded, potentially requiring interpolation, to obtain the second image. Alternatively, using the time of arrival of received measurement pulses, 3D information about the scanned scene of interest may be derived. The 3D point cloud obtained in such a way may be centrally projected onto a Lidar image plane, the Lidar image plane in particular corresponding to the RGB camera image plane. After central projection onto the Lidar image plane, the projected 3D point cloud data may be re-gridded so as to conform to the pixel grid of the three-channel RGB image.

Since a Lidar imaging system is an active imaging system, a high-contrast second set may be obtained in dim environments as well.

The three-channel RGB image and the second image are provided to a neural network $9b$ for image enhancement, the neural network providing a third set $10b$ of images, in FIG. 3 comprising only one image, on which a metrological application can be carried out with a high precision.

Figure 4:
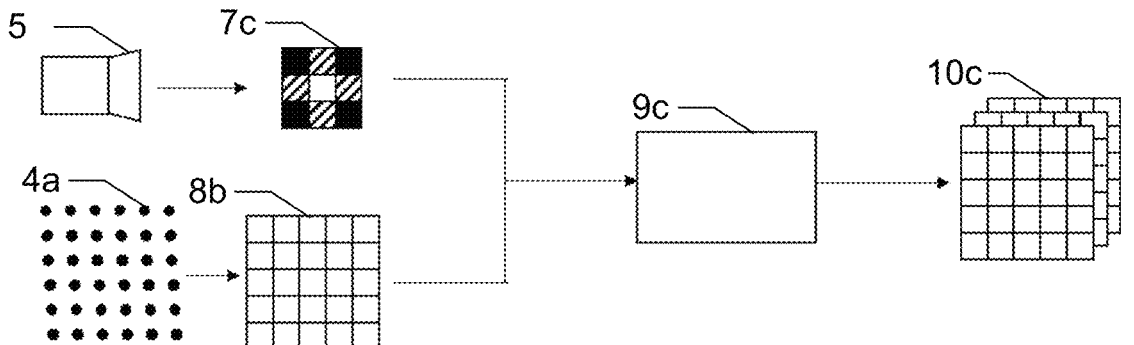
FIG. 4 shows an embodiment of the method according to the invention.

FIG. 4 shows an embodiment of the method according to the invention. FIG. 4 is similar to FIGS. 2 and 3. An RGB camera 5 and a Lidar imaging system provide images. The RGB camera 5 provides a first set $7c$, wherein the first set $7c$ in FIG. 4 comprises only one first image, namely a noisy Bayer image, wherein the noisy Bayer image may be taken with a short exposure time in order to avoid motion blur or the noisy Bayer image may be taken in a dim environment.

The noisy Bayer image has a lower resolution than the second image provided by the Lidar imaging system. A neural network $9c$ used for image enhancement for metrological applications therefore additionally increases the resolution of the noisy Bayer image to the resolution of the second image provided by the Lidar imaging system.

Figure 5:
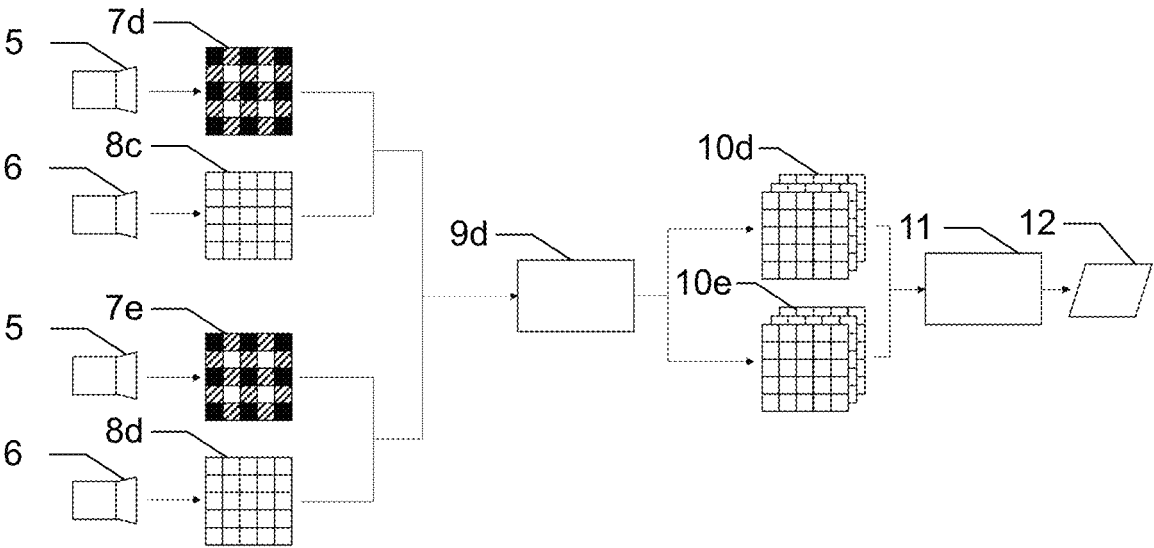
FIG. 5 shows an embodiment of the method according to the invention.

FIG. 5 shows an embodiment of the method according to the invention. An RGB camera 5 (or potentially two different RGB cameras) provides a first set $7d,7e$ of first images, the first images in FIG. 5 being embodied as noisy Bayer images. A monochrome camera 6 (or potentially two different monochrome cameras) provides a second set $8c,8d$ of second images, the second images in FIG. 5 being embodied as monochrome images. The first set $7d,7e$ and the second set $8c,8d$ are provided as input to a neural network $9d$ for image enhancement. The first set of first images shows a scene of interest, i.e. at least one object in the scene of interest is at least partly shown in both of the two first images in the example of FIG. 5. The same considerations apply to the second set $8c,8d$, i.e. the second images show at least partly the scene of interest. The geometric relations between the RGB camera(s) and the monochrome camera(s) may be known, i.e. the relative position and orientation of all image sensors to one another may be known. Relative positions and orientations between the RGB camera(s) and the mono-chrome camera(s) may be provided as additional input to the neural network $9d$. The neural network $9d$ processes the first set $7d,7e$ and the second set $8c,8d$ and provides a third set $10d,10e$ of output images. In the example of FIG. 5, two output images are provided by the neural network $9d$. The two output images may be subsequently used for a metro-logical application, for example triangulation. The metro-logical application may be implemented using at least one fixed and differentiable equation 11 which operates on the two output images, i.e. the third set $10d,10e$. Applying the at least one fixed and differentiable equation 11 to the third set $10d,10e$ provides a metrological output value 12, for example a position in 3D space of a triangulated object shown in the third set $10d,10e$.

The neural network $9d$ may be trained in such a way as to improve results of the metrological application described by the at least one fixed and differentiable equation 11. The neural network $9d$ may be trained to enhance the first set $7d,7e$ and the second set $8c,8d$, wherein the neural network $9d$ may be trained end-to-end using a training data set built up in the following manner—the training data set comprises at least one first training sequence and at least one second training sequence, also termed training data input, wherein at least one of the at least one first training sequence and at least one of the at least one second training sequence is statistically similar to the first set and the second set respectively, wherein statistical similarity may refer to similarity in a probability distribution. Corresponding to the at least one first training sequence and the at least one second training sequence is a training data output comprising e.g. at least one training position information (in 3D) of object(s) shown in the at least one first training sequence and the at least one second training sequence. The neural network $9d$ is trained to generate two output images, i.e. the third set, in such a way as to minimize an error metric, e.g. a mean squared loss, between e.g. at least one position information obtained by applying the at least one fixed and differentiable equation 11 to the generated two output images and the at least one training position information. The error metric to be mini-mized may be evaluated on the training data set. The neural network $9d$ may therefore be trained in such a way as to optimize a particular metrological application given in the form of at least one fixed and differentiable equation 11.

Figure 6:
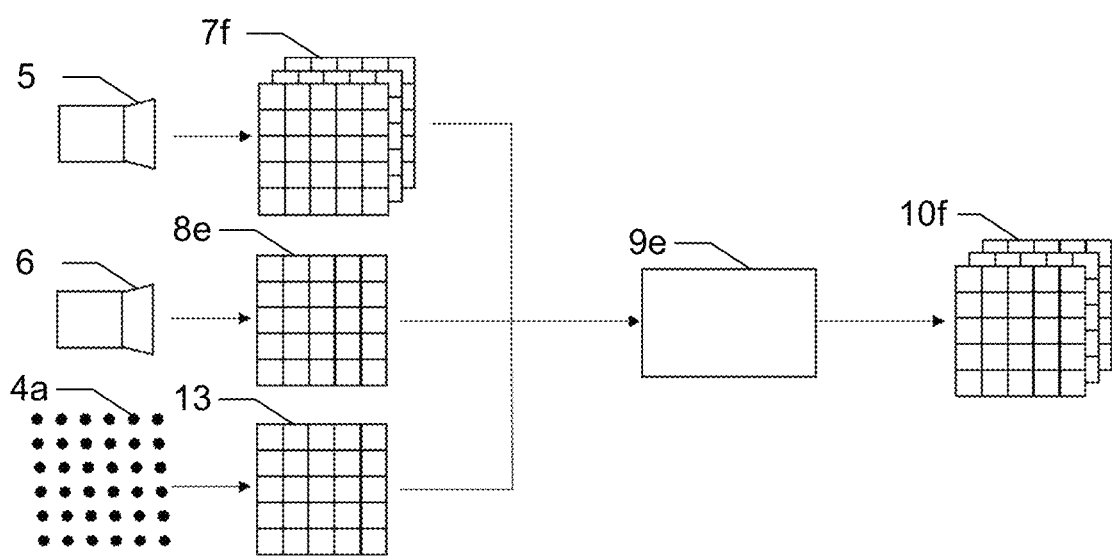
FIG. 6 shows an embodiment of the method according to the invention.

FIG. 6 shows an embodiment of the method according to the invention. An RGB camera 5, a monochrome camera 6 and a Lidar imaging system providing intensity data $4a$ provide a first set $7f$ of first sensor data, a second set $8e$ of second data and a fourth set 13 of fourth sensor data to a neural network $9e$ as input. The network combines and processes the input data to provide an enhanced third set $10f$, wherein the enhanced third set $10f$ is more suitable for further metrological processing providing a metrological application than the input data provided to the neural net-work.

15

16

Figure 7:
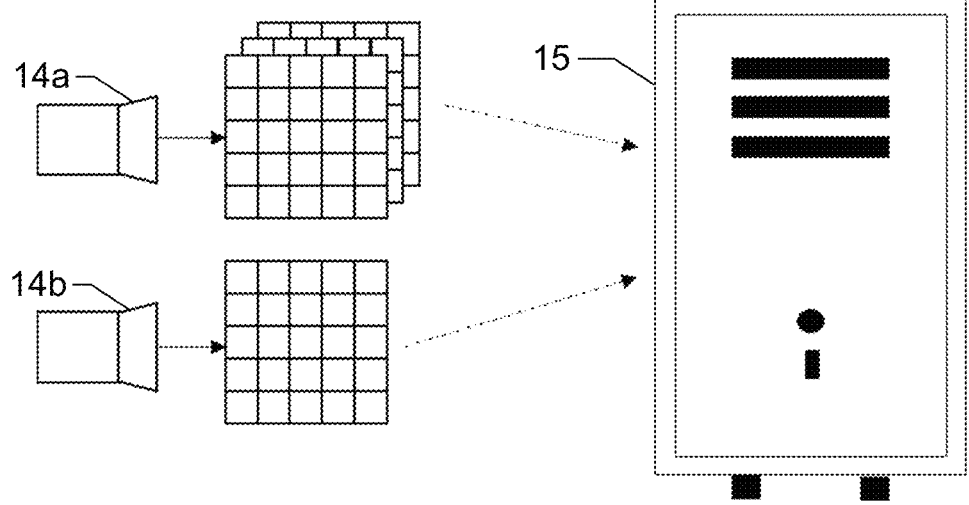
FIG. 7 shows an embodiment of the image processing system according to the invention.

FIG. 7 shows an embodiment of the image processing system according to the invention. A computing unit 15 receives image data provided by two image sensors, for example an RGB camera 14*a* and a monochrome camera 14*b*. A computer program providing the image enhancement method according to the invention may be stored on the computing unit 15 or provided to the computing unit 15 on demand. The computer program enhances the image data so that a metrological application can be carried out on the enhanced image data with increased precision.

Figure 8:
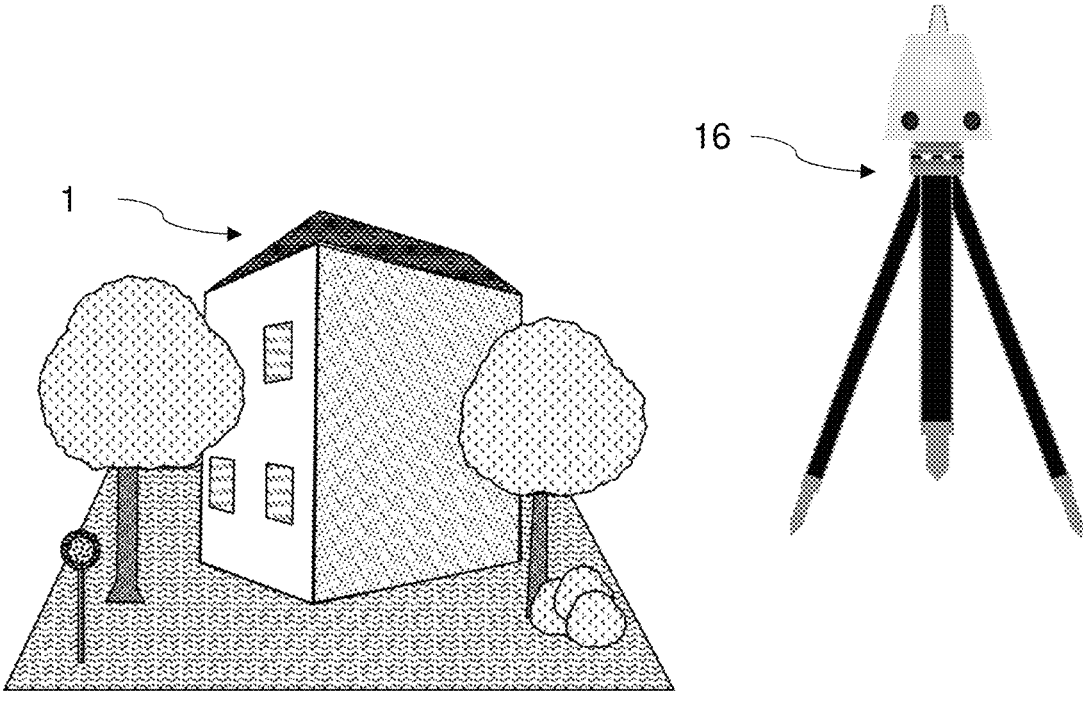
FIG. 8 shows an embodiment of the invention used for mapping a scene of interest with a terrestrial laser scanner on a tripod.

FIG. 8 shows an embodiment of the invention used for mapping a scene of interest 1 with a terrestrial laser scanner 16 on a tripod. The terrestrial laser scanner 18 on a tripod is equipped with a RGB camera acquiring the first set. The second set is provided by the laser scanner. The scene of interest 1 may be a dimly lit urban environment or a dimly lit indoor room, for example. Examples of terrestrial laser scanners are the Leica RTC360 or the Leica BLK360. The invention may also be used with laser trackers such as the Leica ATS600 or with mobile mapping platforms such as the Leica Pegasus 2 or the Pegasus backpack. The Leica BLK2GO is an example of a mapping platform carried by a human user. Total stations (total station positioning system), coordinate measurement machines and articulated arms can be used as well in the invention.

Figure 9:
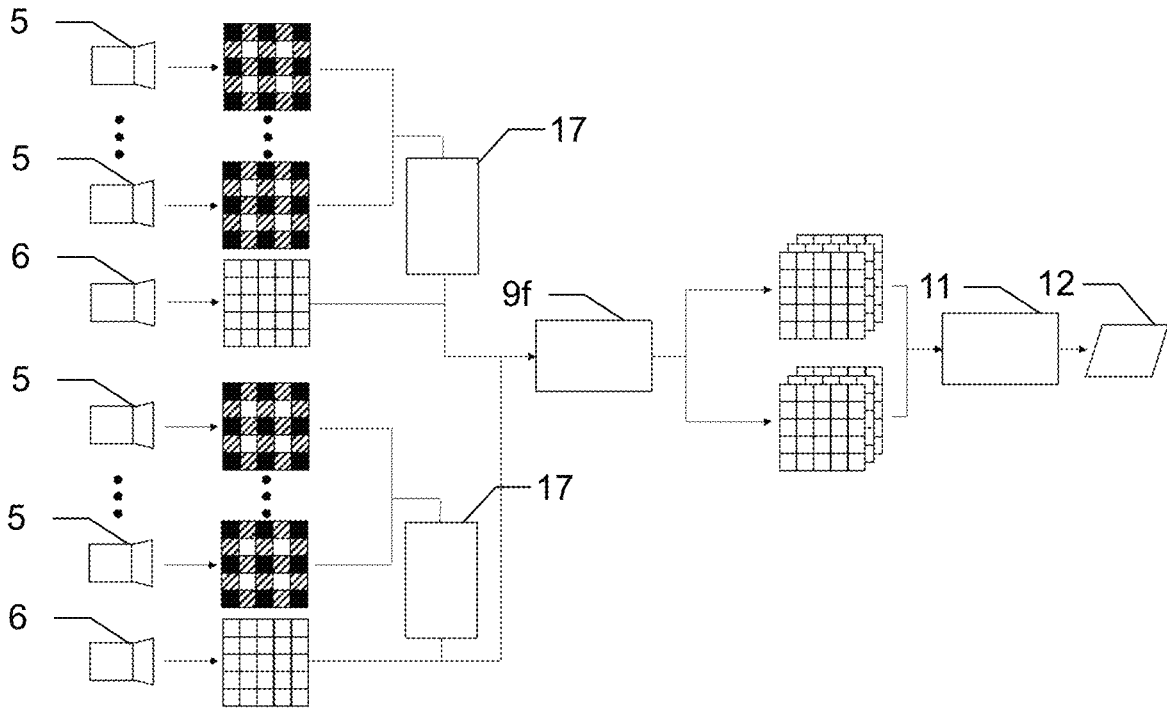
FIG. 9 shows an embodiment of the method according to the invention.

FIG. 9 shows an embodiment of the method according to the invention. A plurality of RGB cameras 5, the RGB cameras potentially differing in position and/or orientation and in camera settings from one another, provides the first set. A monochrome camera 6 provides the second set. The images provided by the plurality of RGB cameras 5 are stitched by a panorama stitching algorithm 17. Each set element of the first set provided to a neural network 9*f* is therefore obtained after panorama stitching a plurality of RGB images. In FIG. 9, both the first set and the second set comprise two set elements respectively. Due to potential radiometric differences between the plurality of RGB images provided by the plurality of RGB camera 5, the stitched image provided by the panorama stitching algorithm 17 may be discontinuous across the stitches. The neural network 9*f* may use the information provided by the monochrome camera 6, i.e. the second set, to correct such discontinuities. The remaining elements of FIG. 9 are the same as in FIG. 5.

Figure 10:
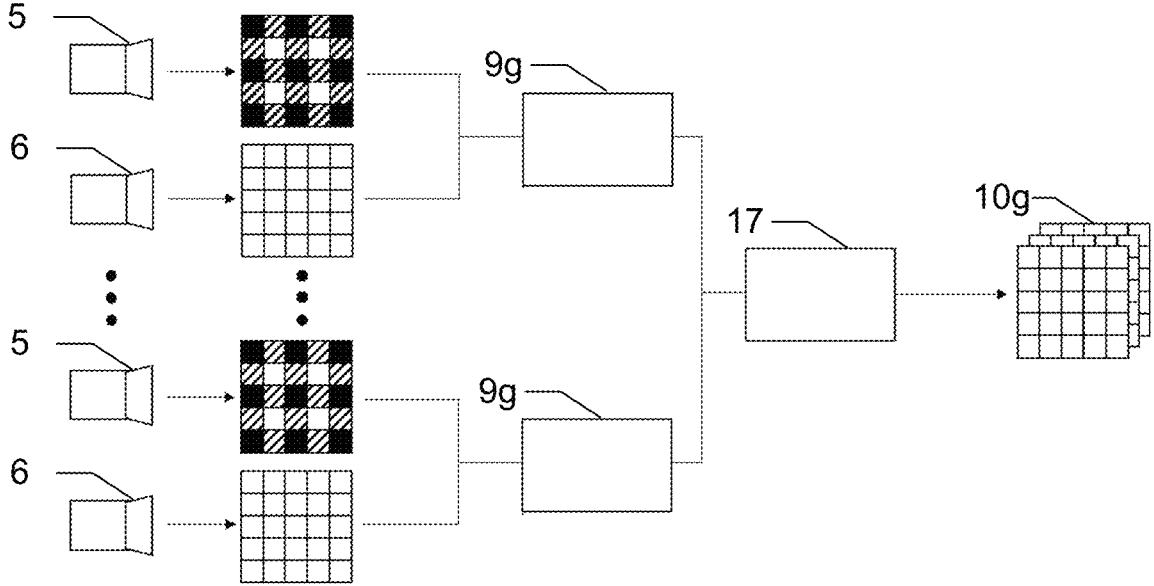
FIG. 10 shows an embodiment of the method according to the invention.

FIG. 10 shows an embodiment of the method according to the invention. An RGB camera 5 and a monochrome camera 6 provide images. Each pair of RGB image and monochrome image is fused by a neural network 9*g*. A plurality of such pairs of RGB/monochrome images may be provided by one RGB camera and one monochrome camera recording images using different positions and/or orientations and/or camera settings, or a plurality of different RGB cameras and monochrome cameras may provide the plurality of RGB/monochrome image pairs at once, for example. After each pair is processed by a neural network 9*g*, the fused images are stitched by a panorama stitching algorithm 17. The neural networks 9*g* used in this embodiment may be jointly trained end-to-end, for example, to optimize the image quality of the image 10*g* obtained after the panorama stitching 17, or each neural network 9*g* may be trained separately to improve its own operation, i.e. the training process is split up into individual training processes. The combination of neural networks 9*g* and the panorama stitching algorithm 17 may be considered to correspond to one neural network jointly processing incoming data in the form of RGB/monochrome images.

It goes without saying that these figures illustrated are merely schematics of possible exemplary embodiments.

Although the invention is illustrated above, partly with reference to some preferred embodiments, it must be understood that numerous modifications and combinations of different features of the embodiments can be made. All of these modifications lie within the scope of the appended claims.

What is claimed is:

1. Method for enhancing images for metrological applications comprising:

providing a first set comprising at least one first image, the first set in particular being a first sequence, wherein the first images are sensor images, wherein the first set represents a scene of interest, and providing a second set comprising at least one second image, the second set in particular being a second sequence, wherein the second images are sensor images, wherein the second set represents at least a part of the scene of interest, wherein the at least one first image and the at least one second image differ geometrically, providing a 3D point cloud by a high resolution Lidar system, wherein the first set and the second set capture partly redundant and partly non-redundant information about the scene of interest, wherein the first and second set comprise at least one corresponding feature, and wherein the second set having a higher geometric correctness than the first set such that the at least one corresponding feature is better defined in the second set, wherein a position and an orientation of at least one corresponding feature is determinable from the second set with an initial precision, jointly processing the first set and the second set by a neural network, and outputting a third set, the third set in particular being a third sequence, of images by the neural network, the third set comprising at least one processed image, from which is determinable the position and orientation of the at least one object with a processed precision, wherein the processed precision is equal to or higher than the initial precision, using the third set of images by the metrological application for colorization of the point cloud, wherein the at least one first image of the first set is color-resolved, and wherein the first image is captured with an exposure time optimized for preserving color information, wherein the at least one second image of the second set:

is provided using a high resolution Lidar imaging system, wherein intensity of received electromagnetic pulses in combination with distances obtained from the received electromagnetic pulses, is used for deriving the at least one second image, wherein a blurriness of the at least one first image is higher than that of the at least one second image and the jointly processing comprises a compensating of the blurriness.

2. Method according to claim 1, wherein the at least one first image of the first set is obtained by a color-resolving camera with a Bayer pattern.

3. Method according to claim 1, Method according to claim 1, wherein the at least one first image is upsampled by the neural network to the resolution of the second image provided by the Lidar imaging system.

4. Method according to claim 1, further comprising a fourth set, the fourth set in particular being a fourth sequence, of fourth images, wherein the fourth images are sensor images, wherein the fourth set comprises at least one fourth image, is additionally provided to the neural network as input, wherein the first set is provided by a color-resolving camera, the fourth set is provided by a monochrome camera, and the second set is provided using the Lidar imaging system.

5. Method according to claim 1, wherein the neural network comprises at least one convolutional layer.

6. Method according to claim 1, wherein the first set and the second set provided to the neural network comprise only one first image and only one second image respectively, and the third set received from the neural network comprises only one processed image, and weights of the neural network are obtained by training the neural network on training data, wherein the training data comprises:

training data input at least one first training image which is statistically similar to the first image and at least one second training image which is statistically similar to the second image, and training data output at least one third training image from which is determinable with high precision a training position and/or training orientation of at least one training object shown in the at least one first training image and the at least one second training image, wherein the neural network jointly maps the training data input onto the training data output, wherein the loss function used for training the neural network is embodied as a mean squared error loss function.

7. Method according to claim 6, wherein the at least one third training image is brighter than the at least one first training image.

8. Method according to claim 1, wherein the first set and the second set provided to the neural network comprise at least two first images and at least two second images respectively, and the third set received from the neural network comprises at least two processed images, and weights of the neural network are obtained by training the neural network on training data, wherein the training data comprises:

training data input a first training sequence of at least two images which are statistically similar to the at least two first images and a second training sequence of at least two images which are statistically similar to the at least two second images, and training data output a training position and/or a training orientation of at least one training object shown in the first training sequence and the second training sequence, wherein the neural network jointly maps the training data input onto a training output sequence of images which are then mapped by at least one differentiable and fixed equation, the at least one fixed equation representing the metrological application, in particular triangulation, onto a candidate training position and/or a candidate training orientation of the at least one training object, wherein the loss function used for training the neural network is embodied as a mean squared error loss function, wherein the training is designed to minimize the loss between the training position and the candidate training position and/or the training orientation and the candidate training orientation.

9. Computer program product with program code being stored on a non-transitory machine readable medium, the program code being configured to provide a trained neural network as in the method according to claim 8.

10. Computer program product with program code being stored on a non-transitory machine readable medium, the program code being configured to provide image enhancement as in the method according to claim 1.

11. Image processing system comprising a computing unit, a computer program product with program code according to claim 10 being stored on the computing unit, and at least two image sensors, a first of the at least two image sensors in particular comprising a fisheye lens, each providing at least one image to the computing unit, wherein the image processing system is configured to carry out the image enhancement method.

12. Image processing system according to claim 11, wherein the image processing system is specifically configured for being part of a car-based mapping platform or of a rail-based mapping platform or of a mapping platform carried by a user or of a static mapping platform.

13. Image processing system according to claim 11, wherein the metrological application comprises a determining a position and/or orientation based on a triangulation measurement.

14. Image processing system according to claim 11, wherein the first images are color resolved images, the second image is a point cloud image, and the metrological application comprises a coloring of the point cloud.

15. Image processing system according to claim 14, wherein the images of the third images are more vivid than the corresponding first images, wherein color being more vivid if moving out from the center of a hue-saturation-lightness cylinder to the edge of the hue-saturation-lightness cylinder.

16. Method according to claim 1, wherein the geometric correctness relating to the sharpness of object contours of objects shown in the at least one third training image as compared to in the at least one first training image.

17. Method for enhancing images for a triangulation of at least one object comprising:

providing a first set comprising at least one first image, the first set in particular being a first sequence, wherein the first images are sensor images, wherein the first set represents a scene of interest, and providing a second set comprising at least one second image, the second set in particular being a second sequence, wherein the second images are sensor images, wherein the second set represents at least a part of the scene of interest, wherein the at least one first image and the at least one second image differ geometrically, wherein-the first set and the second set capture partly redundant and partly non-redundant information about the scene of interest, wherein the first and second set comprise at least one corresponding feature, wherein the second set having a higher geometric correctness than the first set such that the at least one corresponding feature is better defined in the second set wherein a position and an orientation of the at least one corresponding feature is determinable from the second set with an initial precision, jointly processing the first set and the second set by a neural network, and outputting a third set, the third set in particular being a third sequence, of images by the neural network, the third set comprising at least one processed image, from which is determinable the position and orientation of the at least one object with a processed precision, wherein the processed precision is equal to or higher than the initial precision, using the third set of images by the metrological application, the metrological application performing a coloring of the triangulated at least one object, wherein the at least one first image of the first set is color-resolved, and wherein the first image is captured with an exposure time optimized for preserving color information, and wherein the second set comprises images with pixel resolution of at least 1 mm/pixel for objects 10 m from the camera and obtained by a monochrome camera, or wherein a blurriness of the at least one first image is higher than that of the at least one second image and the jointly processing comprises a compensating of the blurriness.

18. Method according to claim 17, wherein the geometric correctness relating to the sharpness of object contours of objects shown in the at least one third training image as compared to in the at least one first training image.

* * * * *